United States Patent Office 3,095,760
Patented July 2, 1963

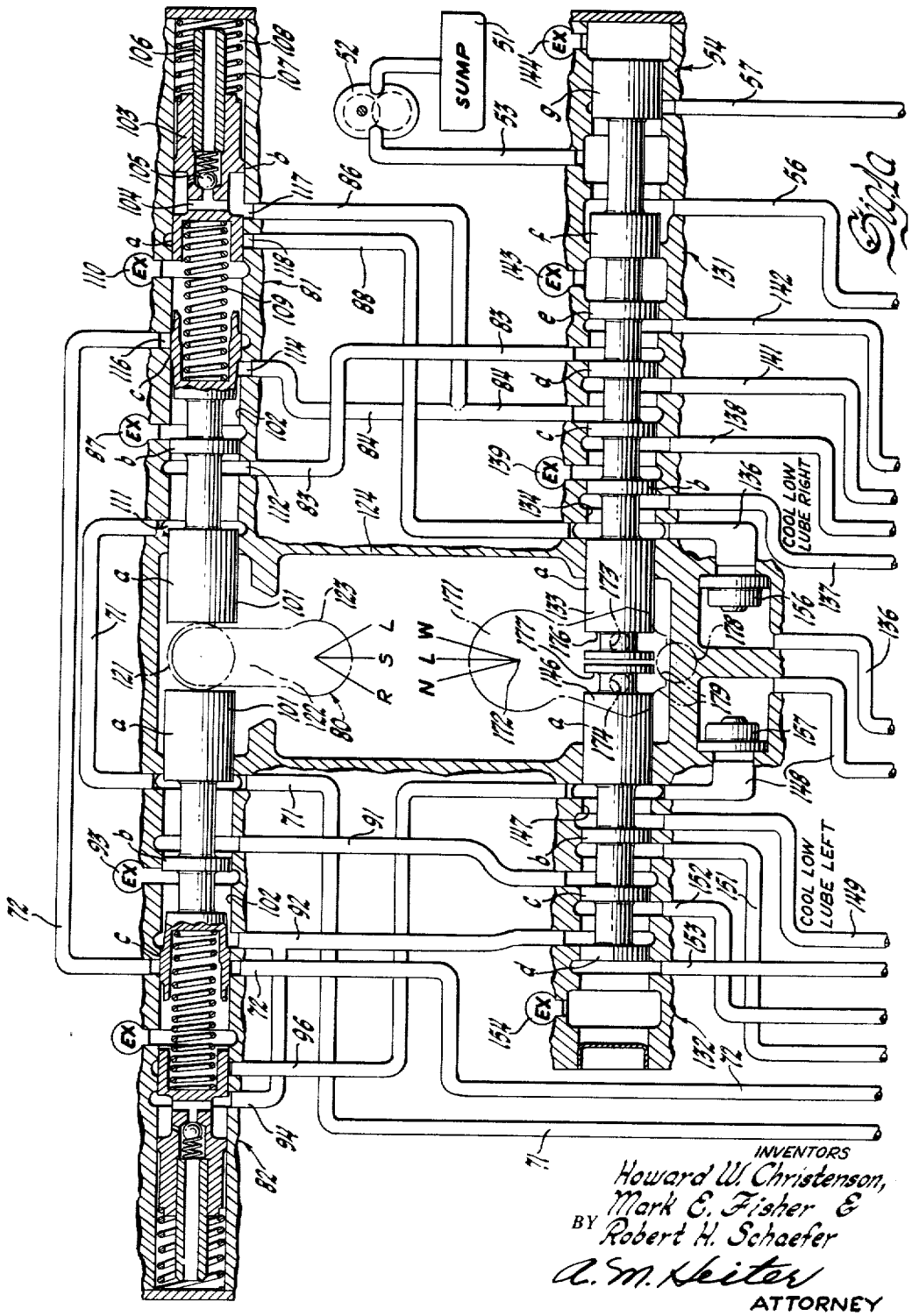

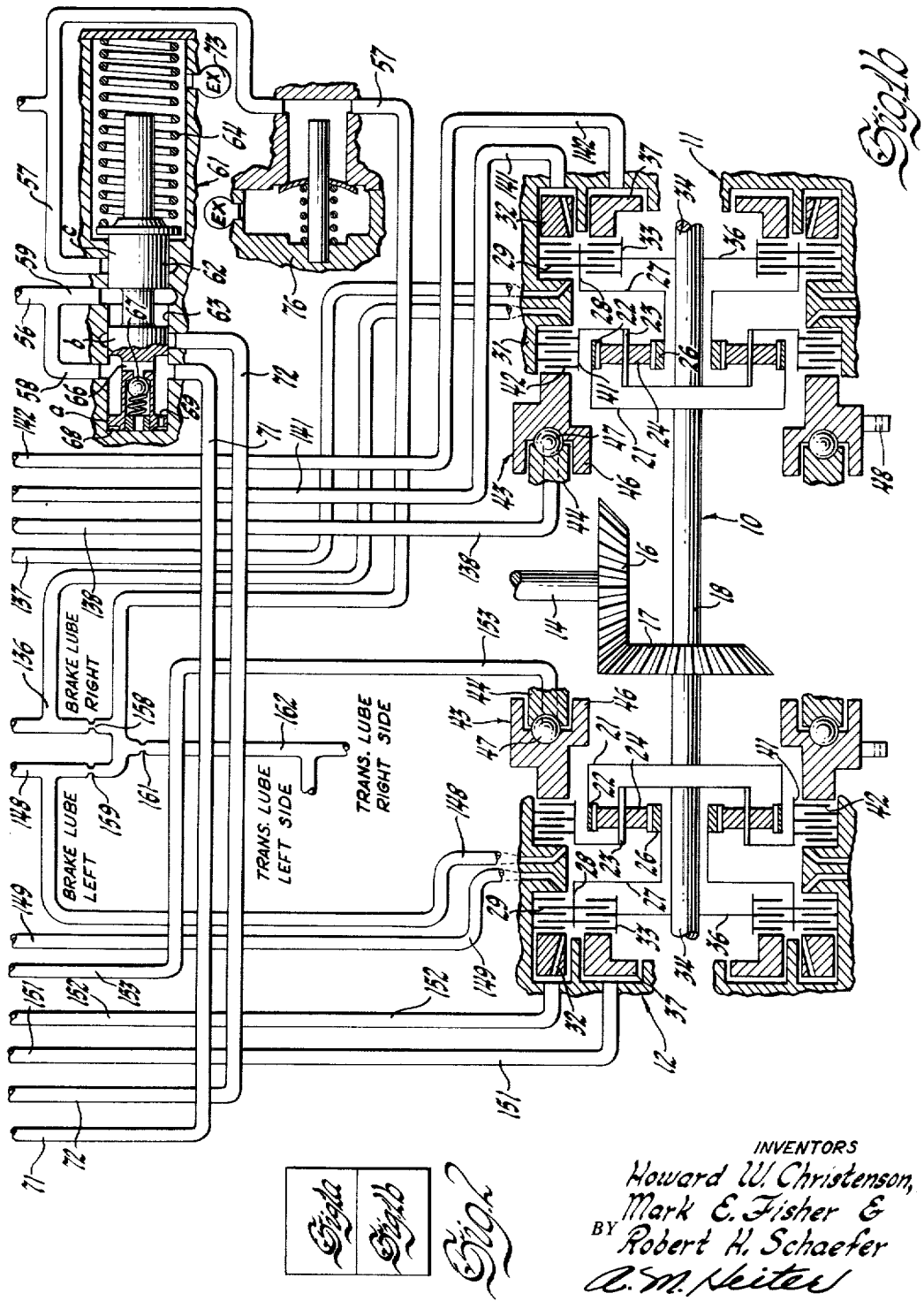

3,095,760
TRANSMISSION
Howard W. Christenson, Indianapolis, Mark E. Fisher, Carmel, and Robert H. Schaefer, Westfield, Ind., assignors to General Motors Corporation, Detroit, Mich., a corporation of Delaware
Filed June 6, 1960, Ser. No. 34,177
25 Claims. (Cl. 74—710.5)

This invention relates to a cross drive transmission and a control system.

The cross drive transmission employs a right and a left drive unit each having a high speed drive, a low speed drive and a vehicle brake. The control system provides two phases of operation. The first phase of operation provides a high speed drive and for steering downshifts one of the units to the low speed drive to provide geared steer. The second phase of operation normally provides the low speed drive and on operation of the steering controls one of the units to disengage the drive and apply the brake to provide clutch brake steer. This control arrangement may be used on all cross drive type vehicles to provide a high ratio drive with geared steer and a low ratio drive with clutch brake steer but is particularly suitable for amphibious vehicles where the normal high drive and geared steering would be used for land operation and the normal low drive and clutch brake steering would be used for operation on the water, since geared steering provides inadequate steering control for water operation.

The transmission is controlled by a hydraulic control system having a source of fluid under pressure employed to control the normal drive. When this portion of the control system is filled with fluid the overflow or exhaust provides the steering control supply. This arrangement insures complete engagement and proper operation of the main drive before steering can be effected. The steering controls provide for the normal engagement of the normal drive and for a gradual build up of the steering drive in accordance with movement of the steering valve and lubrication of the clutch and brake friction elements.

An object of the invention is to provide in a cross drive transmission having a unit at each side of the vehicle providing a high speed drive, a low speed drive and vehicle braking, a control system to provide in a first phase of operation, a normal high ratio drive and geared steering, and in a second phase of operation a normal low ratio and clutch brake steering.

Another object of the invention is to provide in a cross drive control system, a source of pressure, a regulator valve to regulate the pressure of the source and provide a normal drive supply and to employ the primary exhaust of the regulator valve to provide the steering drive supply of fluid under pressure.

Another object of the invention is to provide in a cross drive transmission control system, a primary normal drive supply, a secondary steering supply which is supplied only after the supply to the normal supply is maintained at a predetermined pressure, a steering valve to control the normal drive supply, the steering supply and the lubrication supply, and a manual valve to selectively connect the right and left normal supply and steering supply to provide in a first range of operation normal high drive and geared steer, and in a second range of operation normal low drive and clutch brake steer and to connect the lubrication supply to the friction device being engaged.

These and other objects of the invention will be more apparent from the following description and drawing of the preferred embodiment of the invention.

FIGURES 1a and 1b schematically show the transmission and the hydraulic control system when arranged as shown in FIGURE 2.

The cross drive transmission 10 has a gear unit providing high speed drive, low speed drive and vehicle braking at each side of the vehicle. For convenience referring to FIGURE 1b the gear unit on the right is referred to as the right unit 11 and the one on the left as the left unit 12. The cross drive unit may be driven by an engine with or without a conventional multiratio unit driving the input shaft 14 which is connected by bevel gears 16 and 17 to the cross drive shaft 18.

Since the right unit 11 and the left unit 12 are constructed in the same manner the following description and reference numerals are applied to both of these units. The cross drive shaft 18 at each end drives the driving disc 21 and ring gear 22 of both the right and left planetary gear set. The planetary gear sets have a carrier 23 rotatably carrying a plurality of planetary pinions 24 meshing with the ring gear 22 and a sun gear 26. The sun gear 26 is connected by a control member 27 to a clutch and brake drum 28. The low brake 29 is located externally of the drum 28 and has alternate plates splined to the drum and intermediate plates splined to the housing 31. A fluid motor 32 actuates brake 29 on the supply of fluid to the motor and suitable retraction springs, not shown, disengage the brake. The clutch 33 is located internally of drum 28 and connected to the output shaft 34 by a hub 36. The clutch 33 has alternately plates splined internally to the drum 28 and intermediate plates splined externally to the hub 36. A fluid motor 37 when supplied with fluid under pressure engages the clutch 33 and suitable retraction springs disengage the clutch.

The brake drum 41 is connected by the carrier 23 to the output shaft 34. The brake 42 has alternate discs splined to drum 41 and intermediate discs splined to the housing 31. The brake motor 43 consists of a fixed internal cylinder 44 and a movable external piston 46. On the facing annular surfaces of the piston and cylinder ball ramps and balls 47 are provided for self-energizing braking. When hydraulic fluid is supplied to the brake motor, the piston 46 moves into contact with a rotating vehicle brake plate which tends to rotate the piston. Rotation of the piston due to the action of the balls and cam ramps moves the piston into firmer engagement to provide a self-energized braking force in addition to the hydraulic braking force. In addition, a mechanical brake control, a rod or cable, may be connected to the ear 48 to rotate the piston 46 causing initial engagement due to the cam action of the balls and ramps and further self-energized brake actuation due to the tendency of the brake plates to assist rotation of the piston 46.

Both the right gear unit 11 and the left gear unit 12 may be actuated simultaneously to provide straight forward drive in high ratio by actuating both the right and left motor 37 and the clutch 33 or in low ratio by actuating both the right and left motor 32 and the low brake 29. Both units may be also disengaged by disengaging both the right and left brakes 29 and clutches 33 and both the right and left output shafts 34 may be braked by simultaneously actuating both the brake motor 43 to engage the brakes 42. In addition, the right and left high clutches 33 and low brakes 29 and vehicle brakes 42 may be selectively operated to provide any one of these drives in one unit and another drive in the other unit in accordance with the drive and steering program established by the control system.

Control System—Fluid Supply

Fluid is supplied from a sump 51 normally located in a lower portion of the transmission housing by a pump 52 which delivers fluid under pressure to the pump outlet line 53. The pump outlet line 53 is connected to the manual selector valve 54 which as explained below in the land drive position shown and the water drive position connects pump outlet line 53 to main line 56. In the neutral position selector valve 54 connects pump outlet line 53 to exhaust line 57.

Regulator Valve

The main line 56 is connected by branches 58 and 59 to the regulator valve 61. The regulator valve has a valve element 62 having lands *a*, *b* and *c* of equal diameter located in a bore 63. The valve element 62 is biased to the closed position shown by spring 64 in which fluid at main line pressure enters via branch 58 to the space between the lands *a* and *b* of valve element 62. The fluid in this space communicates via passage 66 and check valve 67 to the closed end 68 of bore 63 to act on the end of land *a* to provide a hydraulic force opposing the biasing force of spring 64. The orifice 69 through land *a* permits a restricted flow in both directions from the space between lands *a* and *b* to the chamber 68 to damp the action of the regulator valve. The check valve 67 permits flow from the space between lands *a* and *b* to the chamber 68 but prevents return flow which must flow through orifice 69 delaying closing movement of valve element 62. Branch 58 is connected to the drive feed line 71 in the closed position of the valve. When the flow stops and the pressure in the drive feed line 71 reaches a predetermined regulated pressure value, i.e., 100 p.s.i., valve element 62 moves to the first open position connecting branch line 58 also to the steer feed line 72 to supply fluid at the same pressure to this line. When the pressure in both lines 71 and 72 is at the regulated value, valve element 62 moves to the exhaust position or regulating position connecting branch 59 directly to exhaust line 57. The chamber for spring 64 has a suitable exhaust 73 to prevent trapped fluid interfering with the operation of the valve. The exhaust line 57 is maintained at a low pressure, i.e., 40 p.s.i., by the relief valve 76.

Steering Valves

The steering valve assembly 80 includes a right steering valve 81 and a left steering valve 82. The right steering valve 81 normally connects the drive feed line 71 to the right drive feed line 83 and blocks the steer feed line 72 and connects the right steer feed line 84 to exhaust 87. On movement of the right steer valve from the normal position to the steering position the drive feed line 71 is blocked and the right drive feed line 83 is connected to exhaust 87 and the steer feed line 72 is connected to the right steer feed line 84 and regulated at a controlled pressure by the right steer feed valve 103. The excess fluid is exhausted to the right lubrication feed line 88.

The left steer valve unit 82 normally connects the drive feed line 71 to the left drive feed line 91 and blocks the steer feed line 72 and connects the left steer feed line 92 to exhaust 93. On movement to the left steer valve unit 82 to the steering position, drive feed line 71 is blocked and the left drive feed line 91 is connected to exhaust 93 and the steer feed line 72 is connected to the left steer feed line 92 and the pressure regulated at branch 94 with the excess fluid supplied to the left lubrication line 96.

Since the structural details and function of both the right and left steering valve units 81 and 82 are the same, the following detailed description with like reference numerals applies to both the right and left steer valve units. Each of the right and left valve units 81 and 82 has a drive valve element 101 having lands *a*, *b* and *c* of equal diameter located in a bore 102. The regulating valve fielement 103 has lands *a* and *b* of the same diameter located in the bore 102. The space between the lands *a* and *b* in valve element 103 is connected by a passage 104, check valve and bypass orifice 105, and a hollow stem 106 to the closed end 108 of bore 102. The stem provides a continuation of the passage 104 and a stop to limit closing movement of valve element 103. The biasing spring 107 located in the closed chamber 108 at the end of bore 102 urges the valve element 103 in an opening direction. The regulating spring 109 is located between the drive valve element 101 and the steer valve element 103. The portion of bore 102 between these valve elements is vented by exhaust 110.

With the steer valve units 81 and 82 in the position shown the drive feed line 71 is connected to the right and left drive feed ports 111 which are connected respectively between lands *a* and *b* of right and left drive valve element 101 to the right and left drive feed port 112. The steer unit feed line ports 114 of each valve are normally connected between the lands *b* and *c* to exhausts 87. In the normal valve position each steer valve therefore delivers main line pressure from the drive feed port to a drive unit feed port and connects a steer unit feed port 114 to an exhaust 87. When a valve element 101 is moved toward the steering position, a drive feed port 111 is first blocked by the land *a* and then a drive unit feed port 112 is connected between lands *a* and *b* to exhaust 87. Shortly thereafter land *c* connects a steer feed port 116 to a steer feed port 114. Each steer unit feed port is interconnected as explained below with the steer unit regulating port 117 which connects the fluid supplied to the steer unit feed line to the space between the lands *a* and *b* of valve element 103 and to the closed end 108 of bore 102 to initiate the regulating action of valve 103. As the valve element 101 is moved toward the closed position and beyond, the regulating spring 109 is compressed increasing the force applied to valve 103 so that the fluid at port 117 is regulated at a gradually increasing pressure. During this regulation during the engagement of the friction device the pressure in chamber 108 will rise to move the valve element 103 against the regulating force of spring 109 to connect port 117 to the lubrication port 118 to provide a lubrication fluid supply. After the friction device has been engaged to the normal degree, depending on the instantaneous torque being transmitted, to terminate slipping, valve element 101 directly engages the valve element 103 to terminate the regulating action and quickly raise the pressure to main line pressure. At this time the flow to the lubrication feed port 118 is terminated.

The valve units 81 and 82 are normally biased by the springs to the position shown where the land *a* of each of the right and left valve elements 101 engages a stop pin 121. The valves are individually operated by the cam member 122 mounted on a rotary control shaft 123 rotatably mounted in the valve housing 124. The shaft 123 is rotated for steering control movement from the straight ahead position S shown to either the right R or the left L to individually operate the left steer valve unit 82 or the right steer valve unit 81 as explained above.

Selector Valve

The selector valve 54 controls the connection of right and left unit feed lines to the right and left drive and brake lines and the unit lubrication lines to the right and left brake lines to provide in the land drive position normally high drive and geared steer and in the water drive position low drive and clutch brake steer. The selector valve unit assembly 54 has a right valve unit 131 and a left valve unit 132. The right and left valve elements 133 and 146 are preferably made in two parts as shown for ease of manufacture but may be made in one piece. The valve elements are simultaneously operated by a lever 171 pivoted at the center 172 and having pins 173 and 174 engaging annular recesses 176 and 177, respectively, in the right and left valve elements 133 and 146. A spring loaded detent 178 cooperates with a series of recesses 179 formed on a circumference about center 172 to retain the valve assembly in the land drive position L shown or neutral N or water drive W.

The right valve unit consists of a right valve element 133 having lands *a*, *b*, *c*, *d*, *e*, *f* and *g* of equal diameter located in a bore 134. Valve element 133 in the land drive position shown connects the right unit lubrication feed line 88 to the right brake lube line 136 and the right low drive lube line 137. The right vehicle brake line 138 is connected to exhaust 139. The right unit steer feed line 84 is connected to the right low brake line 141. The right drive feed line 83 is connected between lands *d* and *e* to the right high clutch line 142. The space between the lands *e* and *f* is connected to exhaust 143. The pump outlet line 53 is connected between the lands *f* and *g* to main line 56 and exhaust line 57 is blocked by land *g*. The closed end of bore 134 is vented by exhaust 144. When the valve element 133 is moved to the water drive position, right lubrication feed line 88 is connected between the lands *a* and *b* to the right brake lube line 136. The right low lube line 137 is connected between lands *b* and *c* to exhaust 139, the right steer feed line 84 is connected between lands *c* and *d* to the right vehicle brake line 138. The right drive feed line 83 is connected between lands *d* and *e* to the right low brake line 141. The right high line 142 is connected between the lands *e* and *f* to exhaust 143. The pump outlet line 53 is connected between the lands *f* and *g* to main line 56. The exhaust line 57 is blocked by land *g*, and the right end of the bore 134 is vented by exhaust 144. When the valve element 133 is moved to the neutral position N, the pump outlet line 53 is connected to the exhaust 57 to directly bypass the pump so that fluid from the pump is not supplied to the regulator valve or any part of the control system.

The left selector valve element 146 has lands *a*, *b*, *c* and *d* of equal diameter located in bore 147. In the land drive position shown, the left lube feed line 96 is connected between the lands *a* and *b* to the left brake lube line 148 and to the left low tube line 149. The left drive feed line 91 is connected between the lands *b* and *c* to the left high line 151. The left steer line 92 is connected between the lands *c* and *d* to the left low line 152. The left vehicle brake line 153 and the end of bore 147 are vented by exhaust 154. When the valve element 146 is moved to the water drive position W, the left lube feed line 96 is connected around the land *a* to the left brake lube line 148, the left high clutch line 151 is connected between the lands *a* and *b* to the left low lube line which provides an exhaust, the left drive feed line 91 is connected between the lands *b* and *c* to the left low line 152 and the steer feed line 92 is connected between the lands *c* and *d* to the left vehicle brake line 153. In neutral the fluid under pressure is not supplied to the system and thus the left selector valve element 146 does not control fluid flow in neutral.

The right vehicle brake lubrication line 136 and the left vehicle brake lubrication line 148 are connected respectively through check valves 156 and 157 permitting flow to the brakes and preventing reverse flow to supply lubrication fluid from the lubrication feed lines to the brake plates. The exhaust line 57 is connected respectively through orifices 158 and 159 to the right and left vehicle brake lube lines 136 and 148 to supply fluid exhausted from main pressure regulator valve via these lines to lubricate the brakes. In addition, exhaust line 57 is also connected through orifice 161 to the transmission lubrication line 162 to lubricate the transmission gearing. The orifice 161 limits the flow of fluid from line 57 to transmission lube line 162 to the proper value for lubricating the transmission gearing and prevents a complete pressure drop so that some fluid will always flow through the orifices 159 and 158 to lubricate the vehicle brakes whenever a higher pressure and volume of fluid is not being supplied through check valves 156 and 157 by lines 136 and 148. The check valves 156 and 157 prevent flow from exhaust line 57 flowing via lines 136 and 148 to the manual valve. In this way the vehicle brakes are supplied with some lubrication fluid at all times and with an increased volume of lubrication fluid when they are engaged during steering.

*Operation*

When the engine is operating the pump 52 is driven to supply fluid via pump outlet line 53 between the lands *f* and *g* of valve element 133 of the manual selector valve 54 in the neutral position to exhaust line 57. Since the exhaust line 57 is connected through orifices 158, 159 and 161 to the right and left brake lubrication lines 136 and 148 and the transmission lubrication line 162 respectively, the pump is substantially completely unloaded so there is little power loss in neutral.

When the manual selector valve 54 is shifted to the land drive position L, or the water drive position W, the pump outlet line 53 is connected between lands *f* and *g* of valve element 133 to the main line 56 and regulator valve 61. The regulator valve initially supplies the drive feed line 71 at main line regulated pressure. When this portion of the system is filled with fluid to engage the drive, the right and left high clutches in land drive and the right and left low brakes in water drive, the excess fluid is exhausted to the steer feed line 72 to supply the same regulated pressure to this line. The excess fluid is connected to exhaust line 57, which provides a supplemental cooling and lubrication supply.

With the selector valve in the land drive position L and the steering valve assembly 80 in the straight drive position S shown in FIGURE 1a, the drive feed line 71 is connected to both the right and left drive feed lines 83 and 91. The right drive feed line 83 is connected between the lands *d* and *e* of the right selector valve element 133 to the right high clutch line 142 and the high clutch motor 37 to engage the right high clutch 33. The right low brake 29 is disengaged since the right brake motor 32 is connected by the right low brake line 141, between the lands *c* and *d* of right selector valve element 133 to the right steer valve 81 which is connected through port 114 to exhaust 87 of steer valve 81. Flow to the right lubrication line 88 is blocked by the land *a* of the steer valve element 103.

The left steer valve element 101 similarly connects the drive feed line 71 between the lands *a* and *b* to the left drive feed line 91 via left manual valve element 146, left high line 151 to engage left high clutch 33. The left steer feed line 92 is connected to exhaust 93 to exhaust, via manual valve 146 and left low line 152, the left low motor 32 disengaging left low brake 29. The land *c* of left valve 101 blocks flow the steer feed line 72 to left steer feed line 92. Land *a* of left steer valve element 103 blocks flow to the left lubrication line 96.

Rotation of the steering control shaft 123 for right steering moves the cam 122 to the right moving valve element 101 to compress regulating spring 109. Initial movement blocks the flow of main line fluid from the drive feed line 71 to the right drive feed line 83 and connects this line to exhaust 87 disengaging the right high drive. This valve movement also disconnects exhaust 87 from the right steer feed line 84 and immediately thereafter connects the steer feed line 72 between the lands *b* and *c* to steer feed line 84. The pressure in this line due to the connection by branch 86 to the space between lands *a* and *b* of steer valve element 103 regulates the pressure in line 84 in accordance with the movement of valve element 101. Movement of valve element 101 acting on valve element 103 provides a gradually increasing pressure in the line 84. At a value varying with varying torque requirements normal engagement occurs. Then at the termination of the gradual pressure rise, the valve element 101 engages valve element 103 to quickly raise the pressure of right steer feed line 84 to full main line pressure. During the time when the valve element 103 regulates the pressure supplied to the right steer feed line 84, the exhaust is connected to the right lubrication line 88 to supply fluid for lubrication.

The right element 133 of selector valve 54 in the land drive position L connects the right steer line 84 to the right low brake line 141 to engage the right low brake 29. The right high clutch 33 is disengaged since the line 142 is connected through selector valve 54 and feed line 83 to exhaust 87. The lubrication feed line 88 is connected to brake lubrication line 136 and low lubrication line 137 to lubricate the right low brake 29.

On left steer the left steer valve and the left manual valve element 146 similarly function. The left element 146 of the manual valve connects the left drive feed line 91 to left high clutch line 151 to engage the left high clutch. On left steering line 91 is vented, the left steer feed line 92 is connected to line 152 to engage the left low brake and the left lubrication line 96 is connected to left low lubrication line 149.

Thus, the selector valve 54 in land drive position and steering valve assembly 80 provide a normal high drive and for steering downshifts one unit from high to low drive to provide geared steer and lubricates the low drive brake.

When the manual selector valve 54 is shifted to the water drive position or heavy duty land drive position the steering valve 80 functions in the same manner to connect the drive feed line 71 to both the right and left drive feed lines 83 and 91. The right drive feed line 83 is then connected between lands $d$ and $e$ to the right low brake line 141 to engage right low brake 29. The left drive feed line 91 is connected between the lands $d$ and $c$ to the left low brake line 152 to engage the left low brake 29. The right high clutch is disengaged since right brake line 142 is connected between the lands $e$ and $f$ to exhaust 143. The left high clutch is disengaged since line 151 is connected between lands $a$ and $b$ of valve element 146 to the left low lubrication line. Fluid is not supplied to lubrication lines 88 and 96. Straight forward low drive is provided.

On right steering, the right steer valve again moves to block the supply from the drive feed line to right drive feed line 83 and connects this line to exhaust 87. Since right drive feed line 83 is connected by manual valve element 133 to right low line 141, the right low brake 29 is disengaged. The right drive valve 101 actuates steering valve element 103 to supply a regulated pressure to right steer feed line 84 which is connected between lands $c$ and $d$ of right manual valve element 133 and line 138 to engage right vehicle brake 42. The right lubrication feed line 88 is connected between lands $a$ and $b$ of valve element 133 to brake lubrication line 136 to lubricate right vehicle brake 42.

With the manual valve in the water position, the left drive valve 101 normally connects drive feed line 71 to left drive feed line 91 which is connected between lands $b$ and $c$ to left low line 152 to engage left low brake 29. On left steer, left valve element 101 disengages the left low brake 29 by connecting left drive feed line 91 to exhaust 93. Left steer feed line 92, which had been connected to exhaust 93 to disengage left vehicle brake 42, is connected to steer feed line 92 and the pressure is regulated by left steer pressure regulator valve 103. The steer feed pressure is connected by left steer feed line 92 between lands $c$ and $d$ of left manual valve 146 to left vehicle brake line 153 to engage the left brake. At the same time fluid is supplied at left steer valve 101 to left lubrication line 96 which is connected around land $a$ of left manual valve element 146 to supply left vehicle brake lubrication line 148. When the brake is fully engaged by main line pressure, the lubrication feed via line 148 terminates but a reduced flow from line 57 continues to insure continued and complete cooling.

It will be appreciated that the above described specific embodiment of the invention may be modified within the scope of the appended claims.

We claim:

1. In a transmission, a fluid operated drive engaging device, a sump, a pump supplying fluid from said sump, a pressure regulator valve, control valve means having a neutral position connecting said pump substantially freely to said sump and a drive position connecting said pump to said regulator valve to regulate the pressure of the fluid supplied by said pump and controlling the supply of fluid under the pressure regulated by said regulator valve to said fluid operated drive engaging device.

2. In a transmission, a first fluid actuated friction device for establishing a primary drive, a second fluid actuated friction engaging device for controlling the torque of the drive, a source of fluid under pressure, a first and a second feed line, a regulator valve controlling the source of fluid under pressure and controlling the pressure supplied to said first and second feed lines at the same value and supplying said first feed line until the flow ceases and then supplying said second feed line, and shift control means connecting said first feed line to said first drive device and connecting said second feed line to said secondary torque control device.

3. In a transmission, a drive unit having a first fluid actuated torque control device and a second fluid actuated torque control device, a sump for collecting exhausted fluid, a pump delivering fluid from said sump, a first and a second feed line, a regulator valve connected to said pump and controlling the supply of fluid from said pump to first supply fluid to said first feed line until the pressure in said drive feed line reaches a predetermined maximum value and then to also supply said second feed line at the same pressure, shift valve means having a neutral position connecting said pump freely to said sump and drive positions connecting said pump to said regulator valve and selectively connecting said first and second lines to said first and second fluid actuated torque control devices.

4. In a transmission, an output shaft, a drive unit having a first fluid actuated torque control device and a second fluid actuated torque control device each being responsive to fluid under pressure to control the torque on said output shaft, a sump for collecting exhausted fluid, a pump delivering fluid from said sump, a first and a second feed line, supply valve means connected to said pump and controlling the supply of fluid from said pump to first supply fluid to said first feed line until the pressure in said first feed line reaches a predetermined value and then to supply said second feed line, shift valve means having a neutral position connecting said pump freely to said sump and drive positions connecting said pump to said supply valve means and selectively connecting said first and second feed lines to said first and second fluid actuated torque control devices.

5. In a transmission, an output shaft, a drive unit having a first fluid actuated torque control device and a second fluid actuated torque control device each being responsive to fluid under pressure to control the torque on said output shaft, a sump for collecting exhausted fluid, a pump delivering fluid from said sump, a first and a second feed line, a regulator valve connected to said pump and controlling the supply of fluid from said pump to first supply fluid to said first feed line until the pressure in said first feed line reaches a predetermined value and then to supply said second feed line and regulate the pressure in said feed lines, shift valve means having a neutral position connecting said pump freely to said sump and drive positions connecting said pump to said regulator valve and selectively connecting said first and second feed lines to said first and second fluid actuated torque control devices.

6. In a transmission, an output shaft, a drive unit having a first fluid actuated torque control device and a second fluid actuated torque control device each being responsive to fluid under pressure to control the torque on said output shaft, a pump for collecting exhausted fluid, a pump delivering fluid from said sump, a first and a second feed line, a regulator valve connected to said pump and controlling the supply of fluid from said pump to first supply fluid to said feed line until the pressure in said first feed line reaches a predetermined maximum value and then to supply said second feed line at the same pressure, shift valve means having a neutral position connecting said pump freely to said sump and drive positions connecting said pump to said regulator valve and selectively connecting said first and second feed lines to said first and second fluid actuated torque control devices.

7. In a transmission, an output shaft, a drive unit having a first fluid actuated torque control device and a second fluid actuated torque control device each being responsive to fluid under pressure to control the torque on said output shaft, a sump for collecting exhausted fluid, a pump delivering fluid from said sump, a first and a second feed line, a regulator valve connected to said pump and controlling the supply of fluid from said pump to first supply fluid to said first feed line until the pressure in said first feed line reaches a predetermined maximum value and then to supply said second feed line and to regulate the pressure in both feed lines shift valve means having a neutral position connecting said pump freely to said sump and drive positions connecting said pump to said regulator valve and selectively connecting said first and second feed lines to said first and second fluid actuated torque control devices.

8. In a transmission, an output shaft, a drive unit having a first fluid actuated torque control friction device and a second fluid actuated torque control friction device each being responsive to fluid under pressure to control the torque transmitted by said output shaft, a sump for collecting exhausted fluid, a pump delivering fluid from said sump, a first and a second feed line, a cooling line connected to supply cooling fluid to said second friction device, a regulator valve connected to said pump and controlling the supply of fluid from said pump to first supply fluid to said first feed line until the pressure in said first feed line reaches a predetermined maximum value and then to supply said second feed line and to regulate the pressure in both said feed lines and connecting the exhaust to said cooling line, shift valve means having a neutral position connecting said pump freely to said sump and drive positions connecting said pump to said regulator valve and selectively connecting said first and second feed lines to said first and second fluid actuated torque control devices.

9. In a transmission, a drive unit having a right and a left, a first, second and third fluid actuated drive torque control device, a sump for collecting exhausted fluid, a pump delivering fluid from said sump, a drive and a steer feed line, a regulator valve connected to said pump and controlling the supply of fluid from said pump to regulate the fluid supply to said drive feed line and said steer feed line, right and left drive feed and steer feed lines, a steer valve normally connecting said drive feed line to said right and left drive feed lines and exhausting said right and left steer feed lines, and selectively operate to right or left positions to selectively connect said right or left drive feed lines and to selectively connect said steer feed line to said right or left steer feed lines, and shift valve means connecting in a first drive range position said right and left drive feed line respectively to said right and left first drive torque control device and said right and left steer feed line respectively to said right and left second drive torque control device and in a second position connecting said right and left drive feed line respectively to said right and left second drive torque control device and said right and left steer feed line respectively to said right and left third drive torque control device.

10. In a transmission, a drive unit having a right and a left first, second and third fluid actuated drive torque control device, a sump for collecting exhausted fluid, a pump delivering fluid from said sump, a drive and a steer feed line, a regulator valve connected to said pump and controlling the supply of fluid from said pump to regulate the fluid supply to said drive feed line, shift valve means having a neutral position connecting said pump freely to said sump and drive range positions connecting said pump to said regulator valve, right and left drive feed and steer feed lines, a steer valve normally connecting said drive feed line to said right and left drive feed lines and exhausting said right and left steer feed lines, and selectively operable to right or left positions to selectively connect said right or left drive feed lines to exhaust and to selectively connect said steer feed line to said right or left steer feed lines, and said shift valve means including range valve means connecting in a first drive range position said right and left drive feed line respectively to said right and left first drive torque control device and said right and left steer feed line respectively to said right and left second drive torque control device and in a second position connecting said right and left drive feed line respectively to said right and left second drive torque control device and said right and left steer feed line respectively to said right and left third drive torque control device.

11. In a transmission; a drive unit having a right and a left first, second and third fluid actuated drive torque control devices; a sump for collecting exhausted fluid; a pump delivering fluid from said sump; a drive and a steer feed line; a regulator valve connected to said pump and controlling the supply of fluid from said pump to first supply fluid to said drive feed line until the pressure in said drive feed line reaches a predetermined maximum value and then to also supply said steer feed line at the same pressure, shift valve means having a neutral position connecting said pump freely to said sump and drive range positions connecting said pump to said regulator valve, right and left drive feed and steer feed lines, a steer valve normally connecting said drive feed line to said right and left drive feed lines and exhausting said right and left steer feed lines, and selectively operable to right or left positions to selectively connect said right or left drive feed lines to exhaust and to selectively connect said steer feed line to said right or left steer feed lines, and said shift valve means including range valve means connecting in a first drive range position said right and left drive feed line respectively to said right and left first drive torque control device and said right and left steer feed line respectively to said right and left second drive torque control device and in a second position connecting said right and left drive feed line respectively to said right and left second drive torque control device and said right and left steer feed line respectively to said right and left third drive torque control device.

12. In a transmission; right and left drive units each having fluid actuated high drive; a fluid actuated low drive and a fluid actuated vehicle brake; a sump; pump means supplying fluid from said sump; a drive feed line; a steer feed line; a pressure regulator valve connecting said pump means to said drive feed line and said steer feed line to supply fluid to said drive feed line and to said steer feed line at a regulated pressure; right and left drive feed lines and steer feed lines; right and left steer valves normally connecting said drive feed line to said right and left drive feed lines respectively and blocking said steer feed line and individually movable to exhaust said right and left drive feed lines, to connect said steer feed line respectively to said right and left steer feed lines and a control valve having a neutral position connecting said pump means freely to said sump, a first drive position connecting said pump means to said regulator valve, said right and left drive feed lines to said right and left high drives, said right and left steer feed lines to said right and left low drives, and a second position connecting said pump means to said regulator valve and said right and left drive feed lines to said right and left low drives, said right and left steer feed lines to said right and left brakes.

13. In a transmission; right and left drive units each having fluid actuated high drive; a fluid actuated low drive and a fluid actuated vehicle brake; a sump; pump means supplying fluid from said sump; a drive feed line; a steer feed line; a pressure regulator valve connecting said pump means to said drive feed line and said steer feed line to supply fluid to said drive feed line and to said steer feed line at a regulated pressure and connect the excess fluid to exhaust; right and left drive feed lines, steer feed lines and lubrication lines; right and left steer valves normally connecting said drive feed line to said right and left drive feed lines respectively and blocking said steer feed line and individually movable to exhaust said right and left drive feed lines, to connect said steer feed line respectively to said right and left steer feed lines and to regulate the pressure in said last mentioned lines at a pressure proportional to valve movement and to connect the excess pressure only during intermediate pressure regulation respectively to said right and left lubrication lines, a control valve having a neutral position connecting said pump means freely to said sump, a first drive position connecting said pump means to said regulator valve, said right and left drive feed lines to said right and left high drives, said right and left steer feed lines to said right and left low drives and said right and left lubrication lines to lubricate said right and left low drives, and a second position connecting said pump means to said regulator valve and said right and left drive feed lines to said right and left low drives, said right and left steer feed lines to said right and left brakes and said right and left lubrication lines to lubricate said right and left brakes, and means connecting said regulator valve exhaust to lubricate said right and left brakes.

14. In a transmission; right and left drive units each having fluid actuated high drive; a fluid actuated low drive and a fluid actuated vehicle brake; a sump; pump means supplying fluid from said sump; a drive feed line; a steer feed line; a pressure regulator valve connecting said pump means to said drive feed line and said steer feed line to supply fluid first to said drive feed line until flow ceases and the pressure is regulated at a predetermined value and then to supply fluid to said steer feed line at a regulated pressure; right and left drive feed lines and steer feed lines; right and left steer valves normally connecting said drive feed line to said right and left drive feed lines respectively and blocking said steer feed line and individually movable to exhaust said right and left drive feed lines, to connect said steer feed line respectively to said right and left steer feed lines and to regulate the pressure in said last mentioned lines at a pressure proportional to valve movement, and a control valve having a neutral position connecting said pump means freely to said sump, a first drive position connecting said pump means to said regulator valve, said right and left drive feed lines to said right and left high drives, said right and left steer feed lines to said right and left low drives, and a second position connecting said pump means to said regulator valve and said right and left drive feed lines to said right and left low drives, said right and left steer feed lines to said right and left brakes.

15. In a transmission; right and left drive units each having fluid actuated high drive; a fluid actuated low drive and a fluid actuated vehicle brake; a sump; pump means supplying fluid from said sump; a drive feed line; a steer feed line; a pressure regulator valve connecting said pump means to said drive feed line and said steer feed line to supply fluid first to said drive feed line until flow ceases and the pressure is regulated at a predetermined value and then to supply fluid to said steer feed line at a regulated pressure; right and left drive feed lines, steer feed lines and lubrication lines; right and left steer valves normally connecting said drive feed line to said right and left drive feed lines respectively and blocking said steer feed line and individually movable to exhaust said right and left drive feed lines, to connect said steer feed line respectively to said right and left steer feed lines and to connect said steer feed line to said right and left lubrication lines, and a control valve having a neutral position connecting said pump means freely to said sump, a first drive position connecting said pump means to said regulator valve, said right and left drive feed lines to said right and left high drives, said right and left steer feed lines to said right and left low drives and said right and left lubrication lines to lubricate said right and left low drives, and a second position connecting said pump means to said regulator valve and said right and left drive feed lines to said right and left low drives, said right and left steer feed lines to said right and left brakes and said right and left lubrication lines to lubricate said right and left brakes.

16. In a transmission; right and left drive units each having fluid actuated high drive; a fluid actuated low drive and a fluid actuated vehicle brake; a sump; pump means supplying fluid from said sump; a drive feed line; a steer feed line; a pressure regulator valve connecting said pump means to said drive feed line and said steer feed line to supply fluid first to said drive feed line until flow ceases and the pressure is regulated at a predetermined value and then to supply fluid to said steer feed line at a regulated pressure; right and left drive feed lines, steer feed lines and lubrication lines; right and left steer valves normally connecting said drive feed line to said right and left drive feed lines respectively and blocking said steer feed line and individually movable to exhaust said right and left drive feed lines, to connect said steer feed line respectively to said right and left steer feed lines and to regulate the pressure in said last mentioned lines at a pressure proportional to valve movement and to connect the excess pressure only during intermediate pressure regulation respectively to said right and left lubrication lines, and a control valve having a neutral position connecting said pump means freely to said sump, a first drive position connecting said pump means to said regulator valve, said right and left drive feed lines to said right and left high drives, said right and left steer feed lines to said right and left low drives and said right and left lubrication lines to lubricate said right and left low drives, and a second position connecting said pump means to said regulator valve and said right and left drive feed lines to said right and left low drives, said right and left steer feed lines to said right and left brakes and said right and left lubrication lines to lubricate said right and left brakes.

17. In a transmission; right and left drive units each having fluid actuated high drive, a fluid actuated low drive and a fluid actuated vehicle brake; a sump; pump means supplying fluid from said sump; a drive feed line; a steer feed line; a pressure regulator valve connecting said pump means to said drive feed line and said steer feed line to supply fluid first to said drive feed line until flow ceases and the pressure is regulated at a predetermined value and then to supply fluid to said steer feed line at a regulated pressure and connect the excess fluid to exhaust; right and left drive feed lines, steer feed lines and lubrication lines; right and left steer valves normally connecting said drive feed line to said right and left drive feed lines respectively and blocking said steer feed line and individually movable to exhaust said right and left drive feed lines, to connect said steer feed line respectively to said right and left steer feed lines and to regulate the pressure in said last mentioned lines at a pressure proportional to valve movement and to connect the excess pressure only during intermediate pressure regulation respectively to said right and left lubrication lines, a control valve having a neutral position connecting said pump means freely to said sump, a first drive position connecting said pump means to said regulator valve, said right and left drive feed lines to said right and left high drives, said right and left steer feed lines to said right and left low drives and said right and left lubrication lines to lubricate said right and left low drives, and a second position connecting said pump means to said regulator valve and said right and left drive feed lines to said right and left low drives, said right and left steer feed lines to said right and left brakes and said right and left lubrication lines to lubricate said right and left brakes, and means connecting said regulator valve exhaust to lubricate said right and left brakes.

18. The invention defined in claim 1 and said control valve means including means operative in said neutral position to connect said pump to lubricate and cool a part of the transmission and then to said sump.

19. The invention defined in claim 1 and said control valve means including passage means operative in said neutral position to connect said pump to lubricate and cool a part of the transmission and then to said sump and said regulator valve having an exhaust connected to said passage means.

20. The invention defined in claim 1 and said control valve means including passage means operative in said neutral position to connect said pump to lubricate and cool a part of the transmission and means to limit the pressure in said passage means to a value substantially lower than the pressure regulated by said regulator valve.

21. The invention defined in claim 1 and said control valve means including passage means operative in said neutral position to connect said pump to lubricate and cool a part of the transmission and then to said sump, said regulator valve having an exhaust connected to said passage means, and means to limit the pressure in said passage means to a value substantially lower than the pressure regulated by said regulator valve.

22. The invention defined in claim 4 and said control valve means including means operative in said neutral position to connect said pump to lubricate and cool a part of the transmission and then to said sump.

23. The invention defined in claim 4 and said control valve means including passage means operative in said neutral position to connect said pump to lubricate and cool a part of the transmission and then to said sump and said regulator valve having an exhaust connected to said passage means.

24. The invention defined in claim 4 and said control valve means including passage means operative in said neutral position to connect said pump to lubricate and cool a part of the transmission and means to limit the pressure in said passage means to a value substantially lower than the pressure regulated by said regulator valve.

25. The invention defined in claim 4 and said control valve means including passage means operative in said neutral position to connect said pump to lubricate and cool a part of the transmission and then to said sump, said regulator valve having an exhaust connected to said passage means, and means to limit the pressure in said passage means to a value substantially lower than the pressure regulated by said regulator valve.

No references cited.

UNITED STATES PATENT OFFICE
CERTIFICATE OF CORRECTION

Patent No. 3,095,760                                July 2, 1963

Howard W. Christenson et al.

It is hereby certified that error appears in the above numbered patent requiring correction and that the said Letters Patent should read as corrected below.

Column 3, line 65, for "flelement" read -- element --; column 5, line 31, for "tube" read -- lube --; column 6, line 44, after "flow" insert -- from --; column 8, line 70, for "pump", first occurrence, read -- sump --; line 74, before "feed line" insert -- first --; column 9, line 18, after "feed lines" insert a comma; line 73, after "feed line" insert -- and said steer feed line --.

Signed and sealed this 14th day of January 1964.

(SEAL)
Attest:
ERNEST W. SWIDER                              EDWIN L. REYNOLDS

Attesting Officer                          Acting Commissioner of Patents